March 14, 1961 R. D. FRYE ET AL 2,974,712
HOSE COUPLING AND METHOD AND APPARATUS FOR PRODUCING SAME
Filed Sept. 17, 1956 2 Sheets-Sheet 2
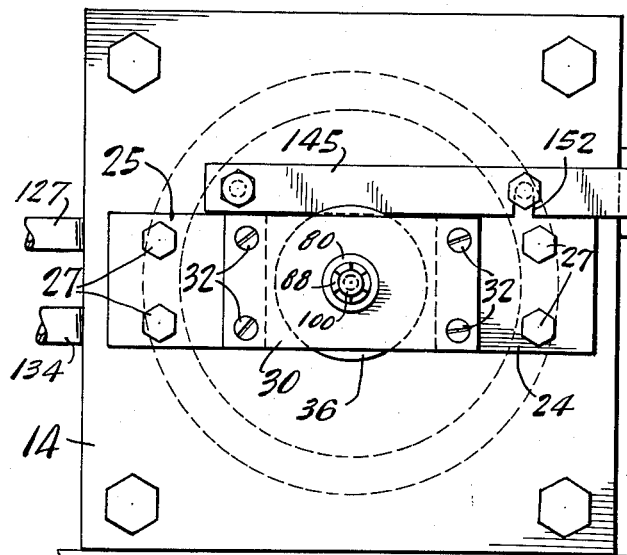
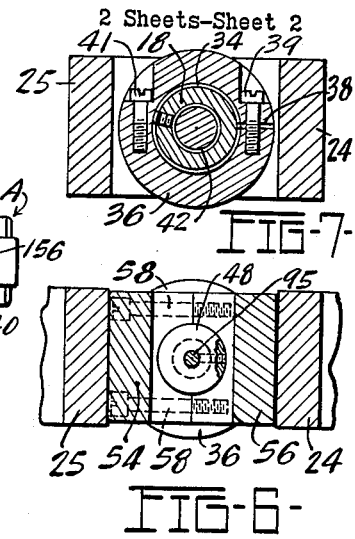
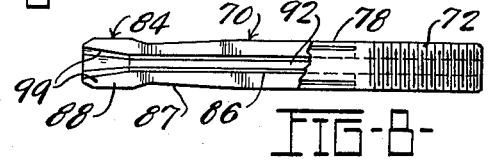
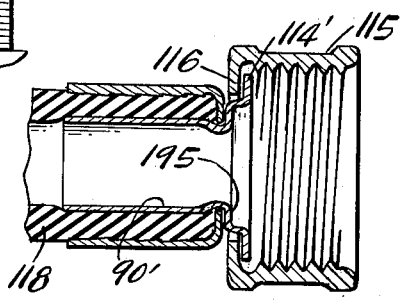
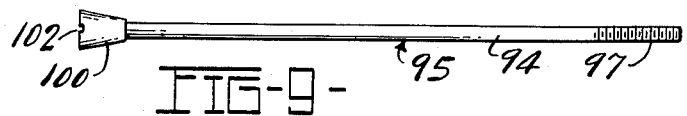
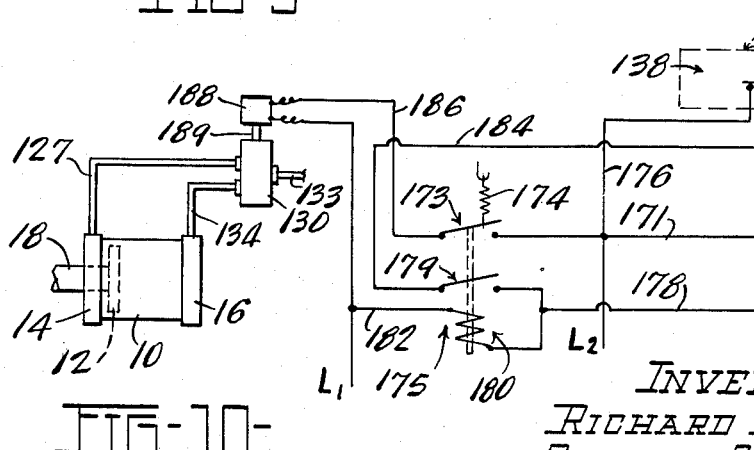
INVENTORS:
RICHARD D. FRYE,
GORMAN C. BURD.
By Harry O. Ernsberger
ATTY.

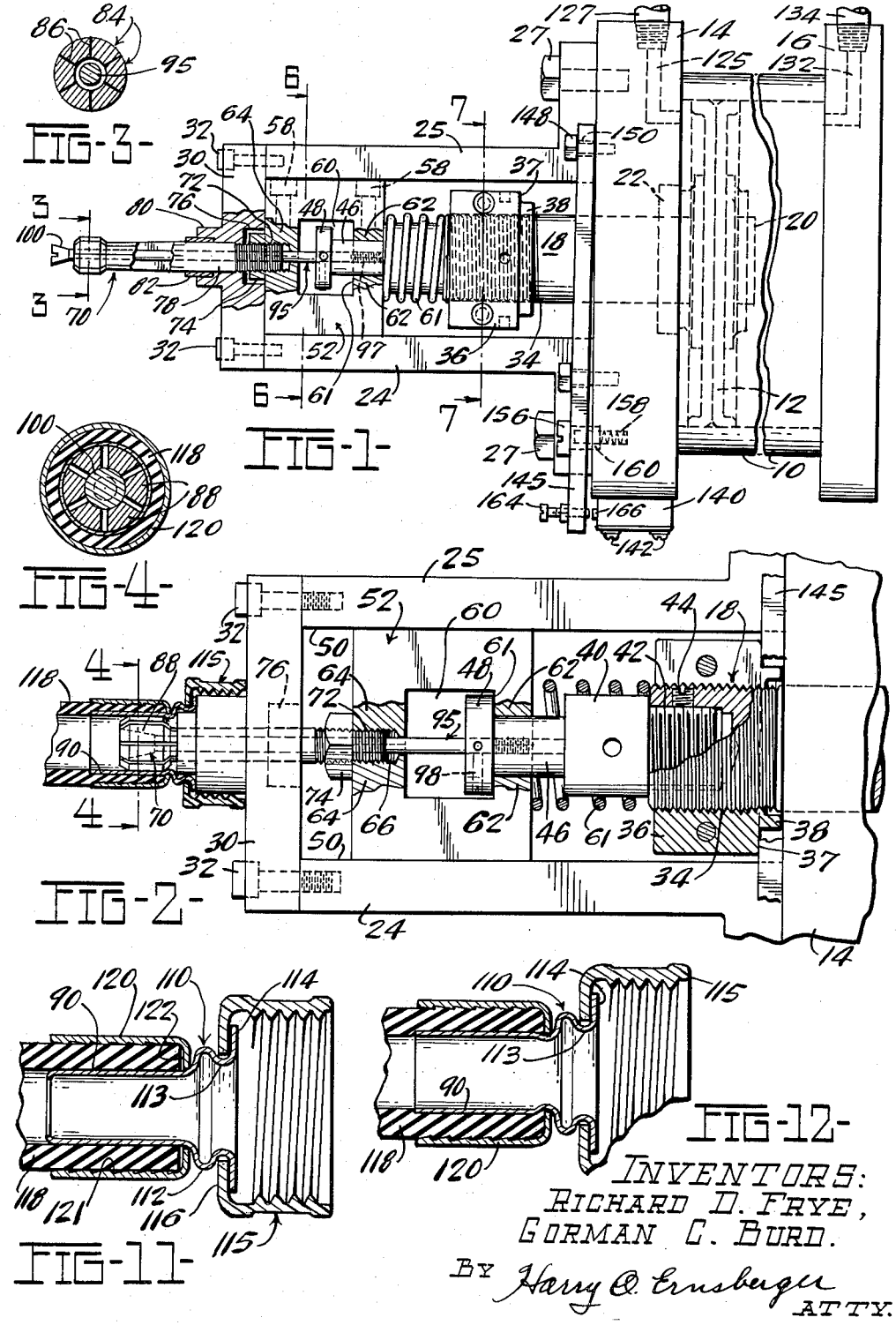

United States Patent Office 2,974,712
Patented Mar. 14, 1961

2,974,712

HOSE COUPLING AND METHOD AND APPARATUS FOR PRODUCING SAME

Richard D. Frye, Erie, Mich., and Gorman C. Burd, Toledo, Ohio, assignors to Neo Products Corporation, Erie, Mich., a corporation of Michigan Filed Sept. 17, 1956, Ser. No. 610,183

4 Claims. (Cl. 153—80.5)

This invention relates to hose coupling construction and to method and apparatus for connecting hose fittings or couplings to end regions of flexible hose and more especially to a method and means of permanently securing a tubular element, nipple or component of a coupling assembly within the end region of a hose.

Various means have been employed heretofore for expanding spaced zones or portions of a tubular element within a hose where the exterior end of the hose is surrounded with a ferrule or collar, the expanded spaced portions proporting to establish a fluid tight seal with a tubular element of a coupling construction. Such constructions have been expensive to produce and have not provided a permanently effective fluid tight sealing means between the hose and the coupling assembly.

The present invention embraces a method of expanding a tubular element disposed within the end region of a hose throughout substantially the entire length of the tubular element whereby an effective fluid seal is established between the tubular element and the flexible hose.

Another object of the invention embraces a method of providing a fluid tight seal between a coupling member and a flexible hose wherein a ferrule is disposed exteriorly of the hose construction and the tubular element inserted in the hose coextensive with the ferrule and an expander arrangement in expanded position drawn through the tubular element to expand the tubular element throughout substantially its entire length in a manner to compress the end region of the flexible hose between the tubular element and ferrule establishing a permanent fluid tight connection.

Another object of the invention is the provision of apparatus for expanding a tubular element throughout substantially its entire length after the tubular element has been inserted in the end region of a flexible hose.

The invention has for a further object the provision of method and means of expanding a tubular member within the end region of a flexible hose surrounded by a ferrule having an inwardly extending flange adjacent the end of the hose wherein the tubular element is expanded at its innermost region within the hose and the expansion progressing toward the end of the hose whereby the material of the hose is flowed or compressed toward the end flange on the ferrule.

Another object of the invention is the provision of a hose coupling construction wherein a tubular nipple forming a component of the coupling construction is expanded circumferentially throughout its length within a hose to establish a fluid tight seal with the hose.

Further objects and advantages are within the scope and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is a top plan view of a novel apparatus for carrying out the method of the invention;

Figure 2 is a plan view of a portion of the apparatus shown in Figure 1 showing the positions of certain elements of the construction at the completion of the nipple expanding operation;

Figure 3 is an enlarged transverse sectional view taken substantially on the line 3—3 of Figure 1;

Figure 4 is an enlarged transverse sectional view taken substantially on the line 4—4 of Figure 2;

Figure 5 is a front end view of the apparatus shown in Figure 1;

Figure 6 is a transverse sectional view taken substantially on the line 6—6 of Figure 1;

Figure 7 is a transverse sectional view taken substantially on the line 7—7 of Figure 1;

Figure 8 is an elevational view of an expanding collet or mandrel forming a component of the apparatus;

Figure 9 is an elevational view of a mandrel expanding member;

Figure 10 is a schematic diagram of an electrical circuit for initiating and carrying on the operations or steps of the method of the invention;

Figure 11 is a longitudinal sectional view illustrating the components of one form of hose fitting before the tubular element in the hose has been expanded;

Figure 12 is a view similar to Figure 11 illustrating the tubular element expanded within the hose; and Figure 13 is a view similar to Figure 12 illustrating a modified form of tubular element or nipple forming a part of a hose fitting or coupling construction.

While the method and apparatus of the invention are illustrated herein as adapted for expanding a tubular member or nipple disposed within the end region of a flexible hose, it is to be understood that the invention may be utilized for the progressive expansion of tubular members wherever the same may be found to have utility.

Referring to the drawings in detail, and initially to Figures 1, 2, and 5, the machine or apparatus of the invention is inclusive of a cylinder 10 within which is reciprocably disposed a piston 12. The cylinder 10 is formed with an interior diameter of a dimension sufficient to provide a piston of an area to obtain an operative pressure of several hundred pounds on the piston rod for performing nipple expanding operations. The cylinder 10 is provided with a front or forward head 14 and a rear head 16. A piston rod 18 is secured to the piston 12 by means of a retaining member 20, the front head 14 being provided with a sealing gasket 22 which forms a fluid tight seal with the periphery of the piston rod 18.

Secured to the frontal face of the cylinder head 14 are L shaped brackets or members 24 and 25, the brackets being secured to the head by means of bolts 27. Disposed at the ends of the forwardly extending legs or portions of the brackets 24 and 25 is a member or plate 30 which is secured to the brackets by means of bolts 32.

A portion of the piston rod 18 exteriorly of the cylinder head 14 is threaded as at 34. Threaded onto the portion 34 is a circularly shaped nut 36, one side zone of which is formed with a kerf 38 as shown in Figure 7 whereby the nut 36 may be drawn into fixed engagement with the threaded portion 34 of the piston rod forming an abutment for limiting rearward movement of the piston rod 18. As shown in Figure 2, the nut 34 is formed with a rearwardly extending annular flange 38 which is adapted to engage the frontal face or surface of the cylinder head 14 as shown in Figure 2.

The kerf 38 in one side region of the nut 36 forms in effect a C shape, the adjacent portions near the kerf 38 being shaped to accommodate a clamping bolt 39 which may be drawn up to hold the nut 36 in fixed engagement with the threaded portion 34 of the piston rod 18. A second bolt 41 opposite the bolt 39 may be used in order to reinforce this portion of the nut 36.

Positioned axially of the piston rod 18 is a member 40 formed with a threaded tenon 42 extending into a threaded bore formed in the end region of the piston rod 18 as particularly shown in Figure 2. A set screw 44 threaded into a transverse bore of the piston rod engages the threaded tenon 42 for holding the member 40 and piston rod 18 in interengaging relation.

The member 40 is formed with a portion 46 of reduced diameter, the latter portion having a head or abutment 48 integrally formed at the end thereof.

Disposed within the inner opposed surfaces 50 of the frame brackets 24 and 25 is a crosshead, slide or member 52 formed of two rectangularly shaped components or blocks 54 and 56. The rectangularly shaped blocks 54 and 56 forming the crosshead are secured together by means of bolts 58 as shown in Figure 6. The members 54 and 56 are recessed to form a rectangularly shaped passage or chamber 60 which accommodates reciprocable movement of the head 48 formed on member 40. The adjacent portions 62 of the blocks 54 and 56 at the right end zone of the chamber or passage 60 as viewed in Figure 1 are bored to provide a guide or bearing for the portion 46 of member 40. An expansive coil spring 61 surrounds the member 40 and exerts a biassing action against the crosshead 52 urging the latter in a left hand direction as viewed in Figures 1 and 2.

The portions 64 of the crosshead 52 are formed with a threaded bore 66. An expanding collet member, mandrel or expander 70, shown in detail in Figure 8, is formed with a threaded portion 72 which is threaded into the bore 66 formed in the crosshead 52, the member being locked in position in the crosshead by means of a securing or lock nut 74. The plate or member 30 is formed with a recess 76 to accommodate the securing nut 74 when the crosshead 52 is moved to its extreme left hand position as viewed in Figure 1.

The plate or member 30 is provided with a bore to slidably accommodate a cylindrical body portion 78 of the expander member 70. A cylindrical boss portion 80 formed on the plate 30 is recessed to accommodate a collar or sleeve 82 which is snugly fitted or pressed into the recess formed in the boss portion 80.

The expander or expanding mandrel arrangement is inclusive of a group of circumferentially arranged, radially expandible segments 84 which are integrally connected with the cylindrical body portion 78, the individual segments being separated by narrow slots 86. The segments 84 are tapered as shown at 87 in Figure 8 and terminate in enlarged portions 88. The segments 84 are shaped and tempered so that the enlarged portions 88 are normally in a closed or contracted position, that is, their position of minimum diameter as shown in Figure 3 preparatory to an expanding operation. In contracted position, the portions 88 of the segments 84 are of a dimension to slidably enter through the interior of the tubular element, nipple or stem 90 forming a component of the hose coupling construction shown in Figure 11.

As particularly shown in Figures 1 and 8 the expanding tool or collet assembly 70 is formed with a longitudinal bore 92 in which is disposed for slidable movement therein the body portion 94 of a collet expanding arbor, rod or mandrel 95. One end of the rod 95 is threaded as at 97 and is received in a threaded bore formed in the portion 46 of member 40 as shown in Figure 2, the rod 95 being adjustable with respect to the member 40 through the threaded connection therewith. After the rod or ram 95 is adjusted to the proper position it may be locked by means of a set screw 98 contained in a transverse threaded bore formed in the head 48 of the member 40.

As particularly shown in Figure 8, the inner-end regions of the portions 88 of the segments 84 are tapered or cone shaped as shown at 99. The end of the rod or mandrel 95 opposite the threaded end 97 is formed with a tapered, cone shaped or wedge portion 100 of a taper substantially the same as the taper 99 of the segment portions 88 so that when the wedge rod 95 is moved in a right hand direction as viewed in Figure 1 the cone-shaped portion 100 engages the tapered surfaces 99 of the segments and expands the segments to the position shown in Figures 2 and 4. The end of the enlarged or tapered portion 100 of the rod 95 is formed with a kerf 102 to receive a suitable tool for adjusting the rod 95 in the threaded bore formed in the portion 46 of the member 40.

The apparatus hereinbefore described is especially useable in joining the end region of a flexible hose with a connector, fitting or coupling assembly such as that shown in Figure 11. With particular reference to Figure 11 a nipple 110 is formed with the tubular portion, stem or shank 90, an outwardly expanded flange portion 112 and a second outwardly projecting flange 114 extending within a threaded coupling nut 115, an inwardly extending flange 116 formed on the coupling nut serving to rotatably secure the nut in cooperative association with the nipple construction 110.

Figure 11 is illustrative of a preassembly of the nipple 110 and nut 115 with a flexible hose 118 and an exterior ferrule or collar 120, preparatory to expanding the tubular portion 90, the ferrule 120 having a buttress thread 121 formed on an interior wall and an inwardly extending flange 122 disposed adjacent the end of the hose 118.

The apparatus of the invention is adapted for expanding the tubular portion or shank 90 of the nipple 110 outwardly throughout substantially its length to compress the material of the hose 118 into close frictional engagement with the ferrule 120 as shown in Figure 12 permanently securing the hose to the coupling construction.

The piston 12 in the cylinder 10, in effecting a nipple expanding operation is operated by fluid under pressure such as compressed air, although oil or other fluid may be employed for the purpose. As shown in Figure 1, the cylinder head 14 is formed with a channel or duct 125 which is connected by means of a tube or pipe 127 with a valve mechanism 130 shown diagrammatically in Figure 10 for conveying fluid such as compressed air into the left-hand end of the cylinder as viewed in Figure 1 so as to move the piston 12 in a right-hand direction to perform an expanding operation upon the tubular member or nipple portion 90.

The rear head 16 of the cylinder construction is formed with a duct 132 in communication with a pipe 134 with the valve mechanism 130 for conveying fluid under pressure into the cylinder 10 at the right-hand side of the piston 12 as viewed in Figure 1 to return the piston and the components or elements connected therewith to their initial positions after the completion of an expanding operation.

Figure 10 is illustrative of an electrical circuit for controlling the operation of the valve mechanism 130 to control the flow of fluid under pressure into the cylinder 10 to accomplish an expanding operation upon the nipple 90 and retract the components of the expanding tool to their initial positions.

The circuit arrangement illustrated in Figure 10 is inclusive of a normally closed micro-switch 138 which, as shown in Figure 1, is enclosed within a housing 140 secured to a lateral wall of the front cylinder head 14 by means of screws 142.

The micro-switch 138 is adapted to be moved to open or circuit-interrupting position by means actuated by contact with the annular shoulder 37 formed on the abutment nut 36 particularly shown in Figures 1 and 2. The means for actuating the micro-switch 138 includes a bar, member or lever 145 which is fulcrumed upon a screw or threaded member 148, shown in Figure 1, the member 148 extending into a threaded bore formed in the front cylinder head 14. The threaded member or bolt 148 is formed with a shoulder portion 150 which is drawn into snug engagement with the face of the head 14 to provide for limited oscillating or swinging movement of the member 145 about the threaded member 148 as a fulcrum or pivotal support.

The lever or member 145 is formed with a recess or slot 152 to accommodate the shank portion of a threaded member or machine screw 156, the threaded shank portion 158 of the screw extending into a threaded bore formed in the cylinder head 14. The bore in the cylinder head accommodating the shank portion 158 of the bolt is formed with an enlarged entrant portion to accommodate an expansive coil spring 160 which serves to hold the lever 145 normally biased to its outermost position shown in Figure 1. The distal end region of the lever 145 is provided with an abutment screw 164 which is adapted to engage a plunger 166 of the micro-switch 138 contained in the housing 140.

The micro-switch actuating lever 145 is normally biased to the position shown in Figure 1 wherein the abutment screw 164 is out of engagement with the plunger 166 of the micro-switch 138 whereby the micro-switch is in a normally closed position. When the piston rod 18 is moved to its extreme rearmost position, the shoulder 38 engages the lever 145 swinging the lever about its fulcrum 148 causing the abutment screw 164 to engage plunger 166 and open the circuit through the micro-switch.

With further reference to the schematic circuit diagram illustrated in Figure 10, the arrangement is inclusive of a foot-operated switch 170, one lead 171 of the foot switch being connected with a current supply line L2 and with a contact of a normally open switch 173 of a self-holding relay 175. A lead wire 176 connected with a contact of the micro-switch 138 is in circuit with the supply line L2 and the lead 171 connected with the foot switch. The second lead 178 from the foot switch 170 is connected with a contact of a second normally open switch means 179 forming a part of the holding relay 175. The lead 178 is also connected with a solenoid 180 of the self-holding relay 175, the solenoid also being connected by lead 182 with the current supply line L1. A lead 184 connects a contact of switch means 179 with the other contact of the micro-switch 138. The other contact of switch means 173 of the holding relay is connected by means of a lead 186 with a solenoid 188, the latter adapted to operate pilot valve mechanism of the pressure fluid or air control valve 130 for controlling the flow of air into the cylinder 10. The solenoid 188 is also connected with the supply line L1.

An important feature of the invention resides in the method of expanding the tubular element, stem or nipple 90 of the hose fitting whereby the same is expanded substantially throughout its length and effects a linear progressive expansion of the nipple portion 90 whereby the material of the hose is caused to flow or is crowded toward the flange 122 of the ferrule 120 to establish an effective and permanent fluid tight coupling with the end region of the hose 118, the stem or nipple portion 90 and ferrule 120.

This is accomplished through the steps of inserting the expandable region of the mandrel in unexpanded condition entirely through the stem 90, expanding the mandrel, and then withdrawing the expanded mandrel toward the end region of the hose so as to progressively enlarge or expand the stem or tubular member 90 toward the flange 122 of the ferrule 120. The completed coupling formed in this manner is illustrated in Figure 12 wherein the tubular member or stem 90 is expanded into the wall of the hose 118 whereby the interior diameter of the expanded stem or tubular member 90 is substantially coincident with the inside diameter of the hose 118.

The operation of the apparatus or machine in performing the method of securing the stem, nipple or tubular member 90 and the ferrule 120 on the end region of a hose 118 is as follows:

The apparatus illustrated in Figures 1 through 9 is normally in the position shown in Figure 1, in which position the piston rod 18 is in its fully extended position with the piston 12 adjacent the foremost or front cylinder head 14 and the expandable mandrel 70 in its fully contracted position with the mandrel expanding wedge rod 95 in its fully retracted position as illustrated in Figure 1.

With the apparatus in the above described position, the operator first slides the ferrule or annular ring member 120 onto the end region of the hose 118 until the inwardly extending flange 122 thereof is adjacent the end of the hose. It will be noted from Figures 11 and 12 that the ledge regions of the buttress type thread 121 are faced toward the flange of the ferrule. The operator then inserts the stem, nipple or tubular element 90 of the component 110 of the coupling into the end of the hose to the position illustrated in Figure 11.

The operator then telescopes the preassembly of hose and stem or nipple portion 90 onto the expandable mandrel or expanding tool 70 until the outwardly extending flange 114 shown in Figure 11 engages and abuts the outermost end wall of the cylindrical boss portion 80. The sleeve 82 shown in Figure 1 is of an exterior diameter to be snugly received by the inner surface of the shoulder 113 of the coupling construction shown in Figure 11. With the components telescoped over the expanding mandrel 70 in the manner explained, the enlarged expandable portions 88 of the mandrel extend entirely through and beyond the end of the stem or nipple 90 the expandable regions 88 being adapted to be expanded prior to engagement of the mandrel with the nipple or stem 90.

Thus after having telescoped the stem 90 over the mandrel or tool 70 bringing the components of the coupling to the positions described, the operator then depresses the foot switch 170 illustrated diagrammatically in Figure 10. Upon closing the foot switch, a circuit is established through the solenoid 180 of the self-holding relay 175 closing both sets of switch contacts 173 and 179 of the relay.

As the contacts of the micro-switch 138 are normally in closed position, a circuit is established through the micro-switch, contacts 179 of the relay and through the solenoid coil 180 of the relay, the latter being thus energized even though pressure on the foot switch is removed so as to maintain a circuit through the solenoid 188 of the air control valve 130. The air control valve mechanism 130 is of a conventional type in which pilot compressed air lines actuate small pilot valves actuated by the solenoid 188 which in turn admit air into the main valves of the construction 130 to control the delivery of compressed air from a supply pipe 133 into the operating cylinder 10.

Upon energization of the air valve control solenoid 188, the plunger 189 actuated by the solenoid moves the valves in the control valve mechanism 130 to direct compressed air or other fluid under pressure from supply pipe 133 through the pipe 127 and duct 125 in the front cylinder head thence into the cylinder at the left side of the piston 12 as viewed in Figure 1. The piston 12 is thus moved by the compressed air or fluid pressure in a right-hand direction as viewed in Figure 1.

The initial movement of the piston 12 first retracts the mandrel expanding or wedge rod 95 in a right-hand direction as viewed in Figure 1 bringing the frusto-conically shaped wedging portion or head 100 thereof into direct contact with the cone-shaped interior surfaces 99 of the enlarged sections 88 of the expanding mandrel construction 70. This initial movement of the piston and the rod 95 immediately expands the mandrel sections 88 outwardly in a region beyond the end of the stem or nipple 90 and within the hose 118 before any longitudinal movement of the mandrel 70 is effected.

As the piston 12 moves in a right-hand direction as viewed in Figure 1, it carries with it the rod 95 and the abutment member or head 48 of portion 46, the head 48 being reciprocable within the rectangularly shaped chamber 60 formed in the slide member or cross head 52. When the cone-shaped or wedge portion 100 of the mandrel expanding rod 95 is in its maximum mandrel expanding position, the abutment shoulder 48 engages a wall 61 of the cross head 52.

Thereafter further movement of the piston 12 carries with it all of the components secured to the piston rod 18, the cross head 52 and the mandrel 70 with the sections 88 expanded to their full outermost positions. With the sections 88 of the mandrel in full expanded position as shown in Figure 4, continued movement of the piston 12 carries the expanded mandrel longitudinally through the nipple or stem 90 in a right-hand direction as viewed in Figure 2, the moving expanded mandrel progressively enlarging or expanding the tubular member stem or nipple 90 throughout its circumference as the mandrel progresses toward the end of the hose.

When the mandrel, in expanded position, is adjacent the flange 122 of the ferrule 120, the abutment shoulder 38 on the abutment nut 36 engages the front face of the cylinder head 14 thus limiting the longitudinal movement of the mandrel while in expanded position. The relative positions of the components of the apparatus and of the components of the hose fitting construction at the completion of a nipple or stem expanding operation are illustrated in Figure 2.

During the progressive expansion of the nipple or stem 90 in a direction toward the end of the hose, the progressive expansion of the nipple or stem tends to flow or crowd the material of the flexible hose 118 toward the ferrule flange 122 so that the material of the hose 118 is tightly compressed in a direction outwardly of the nipple or tubular portion 90 and longitudinally toward the ferrule flange 122 to effect and establish a permanent and durable fluid seal between the hose and the hose coupling components 90 and 120.

Just prior to engagement of the annular shoulder 38 with the face of the cylinder head 14, the surface or shoulder 37 of the abutment nut 36 engages the bar or lever 145 swinging the latter about its fulcrum screw 148, compressing the spring 160 and moving the abutment screw 164 against the plunger 166 of the micro-switch 138 to disengage the contacts of the micro-switch. The interruption of the circuit through the micro-switch 138 deenergizes the solenoid coil 180 of the holding relay 175 and under the influence of a contractile spring 174 of the relay, the contact mechanisms 173 and 179 are moved to open circuit positions.

Opening of the switch mechanism 173 of the relay 175 deenergizes the solenoid 188 and under the influence of a biasing spring (not shown) the plunger 189 of the valve mechanism 130 is moved or retracted to a position interrupting flow of compressed air through the tube or pipe 127, venting the space in the cylinder 10 at the left side of the piston 12 as viewed in Figure 1 and directing compressed air from the supply pipe 133 through the pipe 134 and duct 132 into the opposite end of the cylinder to move the piston 12, piston rod 18 and components of the apparatus associated therewith in a left hand direction as viewed in Figure 1.

During the first part of the return cycle of the piston 12 the wedge rod 95 of the mandrel construction, being connected with the piston through the medium of the member 46 is moved in a left hand direction as viewed in Figures 1 and 2. Simultaneously the abutment 48 also moves in a left hand direction and the crosshead 52, under the influence or bias of the compressed spring 61 is also moved in a left hand direction carrying with it the mandrel or tool 70.

As the mandrel sections 88 are in expanded position during the portion of the return stroke of the piston rod until the slide or crosshead 52 abuts the plate 30, the friction between the expanded mandrel sections 88 and the inner wall of the nipple portion 90 is effective to cause the completed hose coupling and hose to be carried with the mandrel 70 away from the plate 30. Retractive movement of the crosshead 52 ceases when it contacts the plate 30 and the remaining travel of the piston on the retracting stroke moves the wedge rod 95 to disengage the cone-shaped head 100 from the interior surface of the mandrel sections 88. As the head 100 moves away from the sections or segments 88, the segments, under the influence of inherent tension therein, are returned to their contracted or innermost positions as shown in Figures 1 and 3. With the mandrel sections in contracted position, the completed hose coupling construction as shown in Figure 12 may be slidably removed from the mandrel 70. The apparatus in this position is again in readiness to receive another coupling assembly as shown in Figure 11 with the stem or nipple portion 90 in unexpanded condition.

It will be apparent from the foregoing description that a hose coupling construction may be quickly affixed to the end region of a flexible hose by the steps of the method as above described which become automatic upon depression of the foot switch 170 to initiate a cycle of the apparatus. It should be noted that if the foot switch is held in closed position, the piston 12, the rod 18 and components carried thereby will be held in their extreme right hand positions as viewed in Figure 2 as the micro-switch 138, even though in circuit opening position, is ineffective to interrupt the circuit through the solenoid 180 of the holding relay because current flow continues through the solenoid as long as the foot operated switch 170 is held in circuit closing position. When foot pressure is released upon the switch 170, the components of the apparatus will move immediately in a left hand direction by reason of deenergization of the solenoid 180 of the holding relay for the reason that the micro-switch 138 has been previously opened by movement of the lever 145.

Figure 13 illustrates a modified form of coupling construction which may be secured to a flexible hose 118 in the same manner as the fitting illustrated in Figures 11 and 12. In the form of construction shown in Figure 13 the nipple 95 is formed at one end with an outwardly extending shoulder 195 which in turn is integrally connected with the outwardly projecting flange 145 which overlaps the inwardly extending flange 116 formed on the nut 115 of the coupling construction.

While the arrangements as shown in the drawings are particularly usable for securing a nipple portion of a female type fitting to a flexible hose, it is to be understood that the method and apparatus may be employed for securing the nipple portion of a male fitting to a hose. When the apparatus is to be used with male fittings, the boss portion 80 on the plate 30 is shaped or configurated to accommodate the conventional threaded coupling portion of a male fitting.

It is apparent that, within the scope of the invention, modifications and different arrangements may be made other than herein disclosed, and the present disclosure is illustrative merely, the invention comprehending all variations thereof.

We claim:

1. Apparatus for securing hose ends to hose fittings, in combination, a cylinder, a fluid pressure actuated piston reciprocable in the cylinder, a piston rod connected to the piston and having a threaded portion, an adjustable first abutment mounted on the threaded portion of the rod, a frame associated with the cylinder including spaced parallel ways, a crosshead slidably mounted by the ways and having a passage formed therein, said crosshead being arranged for slidable movement relative to said piston rod, means actuated by the piston rod including a second abutment extending into the passage for limiting relative movement of the crosshead, spring means normally biasing said crosshead in a direction away from the piston rod, an expandible mandrel carried by the crosshead and normally in unexpanded condition adapted to receive a tubular element of the hose fitting to be expanded in a hose, a ram within the mandrel and connected with the second abutment and arranged to be reciprocated by the piston rod, said ram having a portion adapted to expand the mandrel by movement of the ram relative to the mandrel, the parts being arranged whereby initial movement of the piston by fluid pressure moves the second abutment into engagement with the crosshead to expand the mandrel by the ram and further movement of the piston draws the expanded mandrel through the tubular element to progressively expand the element substantially throughout its length, and electrically actuated valve means for controlling the delivery of fluid under pressure into the cylinder.

2. Apparatus for securing hose ends to hose fittings, in combination, a frame, a cylinder secured to the frame, a fluid pressure actuated piston reciprocable in the cylinder, a piston rod connected to the piston, an adjustable abutment mounted on said piston rod exteriorly of the cylinder, said frame being formed with a pair of ways, a crosshead slidably mounted in the ways and having a passage formed therein, means movable with said piston rod including a second abutment extending into the passage in the crosshead and engagable with the crosshead for limiting relative movement of the crosshead with respect to the piston rod, spring means normally biasing the crosshead in a direction away from the cylinder, an expansible mandrel carried by the crosshead and normally in unexpanded condition adapted to receive a tubular element of a hose fitting to be expanded in a hose, a ram within the mandrel and connected with the means formed with the second abutment and arranged to be reciprocated by the piston rod, said ram having a portion adapted to expand the mandrel by movement of the ram relative to the crosshead upon initial movement of the piston, means for controlling flow of fluid under pressure into the cylinder for actuating said piston, said second abutment engaging the crosshead to limit the movement of the ram relative to the crosshead whereby further movement of the piston moves the crosshead and expanded mandrel simultaneously to draw the expanded mandrel through the tubular element to progressively expand the element substantially throughout its length.

3. Apparatus for securing hose ends to hose fittings, in combination, a frame, a cylinder secured to the frame, a fluid pressure actuated piston reciprocable in the cylinder, a piston rod connected to the piston and having a threaded portion, an adjustable first abutment on the threaded portion of said piston rod, said frame being formed with a pair of ways, a crosshead slidably mounted in the ways and having a passage formed therein, means movable with said piston rod including a second abutment extending into the passage in the crosshead and engageable with the crosshead for limiting relative movement of the crosshead with respect to the piston rod, a coil spring disposed between the first abutment and the crosshead normally biasing the crosshead in a direction away from the cylinder, an expansible mandrel secured to the crosshead and normally in unexpanded condition adapted to receive a tubular element of a hose fitting to be expanded in a hose, a ram within the mandrel and connected with the means forming the second abutment and arranged to be reciprocated by the piston rod, said ram having a portion adapted to expand the mandrel by movement of the ram relative to the crosshead upon initial movement of the piston means for controlling flow of fluid under pressure into the cylinder for actuating said piston, said second abutment engaging the crosshead to limit the movement of the ram relative to the crosshead whereby further movement of the piston moves the crosshead and expanded mandrel to draw the expanded mandrel through the tubular element to progressively expand the element substantially throughout its length, and electrically actuated valve means for controlling delivery of fluid under pressure into the cylinder.

4. Apparatus for securing hose ends to hose fittings, in combination, a frame provided with a pair of ways, an actuator including a cylinder secured to the frame, a fluid pressure actuated piston reciprocable in the cylinder, a crosshead slidably supported by the ways of the frame, an expansible mandrel secured to said crosshead, a piston rod connected with the piston, a ram element for expanding the mandrel adapted to be actuated by said piston rod, a lost motion connection between the piston and the crosshead whereby initial movement of the piston moves said ram relative to the mandrel to expand the mandrel, said mandrel in unexpanded condition adapted to receive a tubular element of the hose fitting adapted to be expanded in a hose upon movement of the piston after the lost motion is taken up by engagement of an abutment on the piston rod with the crosshead, resilient means normally opposing relative movement between the crosshead and the piston, valve means for controlling delivery of fluid under pressure into the cylinder to actuate the piston, electrically actuated means for controlling said valve means, switch means for operating said valve means to open the valve means for delivery of fluid into the cylinder, a holding relay for maintaining said switch means in circuit closing position during movement of said piston, an abutment carried by the piston rod, and a second switch means operated by the abutment when the piston has reached the limit of its movement for deenergizing the holding relay to cause movement of the valve means to return the piston to its normal position in the cylinder at the completion of movement of the expanded mandrel in expanding the tubular element of the hose fitting.

References Cited in the file of this patent

UNITED STATES PATENTS

| | | |
|---|---|---|
| 2,089,790 | Halpern | Aug. 10, 1937 |
| 2,147,355 | Scholtes | Feb. 14, 1939 |
| 2,181,673 | Tompkins | Nov. 28, 1939 |
| 2,298,379 | Hoffman | Oct. 13, 1942 |
| 2,357,123 | Maxwell | Aug. 29, 1944 |
| 2,377,829 | Vaill | June 5, 1945 |
| 2,427,685 | Midtlying | Sept. 23, 1947 |
| 2,542,305 | Beinen | Feb. 20, 1951 |
| 2,735,473 | Diget | Feb. 21, 1956 |